(12) United States Patent
Maruo et al.

(10) Patent No.: US 7,058,179 B1
(45) Date of Patent: Jun. 6, 2006

(54) METHOD AND SYSTEM FOR A SECURE HIGH BANDWIDTH BUS IN A TRANSCEIVER DEVICE

(75) Inventors: Jun Maruo, Tokyo (JP); Atsushi Kagami, Tokyo (JP)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 0 days.

(21) Appl. No.: 09/538,517

(22) Filed: Mar. 29, 2000

(51) Int. Cl.
*H04L 9/00* (2006.01)

(52) U.S. Cl. .................. 380/211; 380/201; 725/111; 710/107

(58) Field of Classification Search ........... 380/211, 380/201; 725/111; 710/107
See application file for complete search history.

(56) References Cited

U.S. PATENT DOCUMENTS

| | | | |
|---|---|---|---|
| 5,455,862 A * | 10/1995 | Hoskinson | 380/262 |
| 5,805,706 A * | 9/1998 | Davis | 713/153 |
| 5,825,879 A * | 10/1998 | Davis | 380/216 |
| 5,872,846 A * | 2/1999 | Ichikawa | 380/282 |
| 5,944,822 A | 8/1999 | Cornils | 713/200 |
| 5,990,927 A * | 11/1999 | Hendricks et al. | 725/132 |
| 6,098,133 A * | 8/2000 | Summers et al. | 710/107 |
| 6,195,642 B1 | 2/2001 | Izumi et al. | 705/1 |
| 6,286,103 B1 * | 9/2001 | Maillard et al. | 713/200 |
| 6,751,321 B1 * | 6/2004 | Kato et al. | 380/201 |

OTHER PUBLICATIONS

Hayes, John P., Computer Architecture and Organization, 1988, McGraw-Hill, Inc., pp. 139-147.*

Society of Cable Telecommunications Engineers, Inc.; Engineering Committee Digital Video Subcommittee; "Point of-Deployment (POD) Module Interface Proposal"; SCTE DVS 131 Rev. 8; Apr. 13, 1999.

Advanced Television Systems Committee; "Program and System Information Protocol for Terrestrial Broadcast and Cable"; ATSC Standard Doc. A/65; Dec. 23, 1997.

JP 11-161165A (Hitachi Ltd) Jun. 18, 1999, see Figure 1 and title.

* cited by examiner

*Primary Examiner*—Christopher Revak
*Assistant Examiner*—Taghi T. Arani

(57) ABSTRACT

A transceiver system for receiving content contained in a secure digital broadcast signal. The transceiver system includes a first component for generating a data stream from a received digital broadcast signal. A first encryption unit is coupled to the first component. The first encryption unit is configured to encrypt the data stream generated from the digital broadcast signal, resulting in encrypted data stream. Transceiver system includes a second component for generating a video signal for a monitor to view that content contained in digital broadcast signal. A second encryption unit is coupled to the second component for decrypting the encrypted data stream received from the first component. A bus is coupled to the first encryption unit and second encryption unit. A third component is coupled to the bus for arbitration of the bus to coordinate the transmission of the encrypted data stream from the first encryption unit to the second encryption unit such that content from the data stream is securely transferred from the first component to second component. In so doing, the security of the content of the digital broadcast signal is maintained as the resulting data stream is processed by the first component and second component.

44 Claims, 9 Drawing Sheets

METHOD AND SYSTEM FOR A SECURE HIGH BANDWIDTH BUS IN A TRANSCEIVER DEVICE

FIELD OF THE INVENTION

The present invention relates to the field of intelligent transceivers such as bi-directional set-top boxes used by the cable and satellite television industry. More specifically, the present invention pertains to a method and system for maintaining secure transmission of copyrighted data between internal components of an intelligent transceiver while reducing overhead required for the secure transmission process.

BACKGROUND ART

Digital broadcast systems include direct broadcast digital satellite systems, interactive World Wide Web ("Web") access systems, and digital cable systems. Digital broadcasting provides a number of advantages to subscribers, such as variety and flexibility of programming, useful and comprehensive support services (such as detailed electronic programming guides), and superior audio and video quality.

The Conditional Access (CA) function of a digital broadcast system allows selective access to valuable copyrighted information. Such information includes, for example, pay-per view movies, premium sporting events, etc. The producers of the movies, events, etc., require that access to the premium services be controlled in order to protect and enforce their copyrights, protect copyright ownership, and protect their commercial interests as well. The digital broadcast system operators (also referred to as Multiple System Operators, MSOs) also have a commercial interest in preventing unauthorized use and in limiting access to these premium services to authorized users only.

To prevent unauthorized use, MSOs typically broadcast a scrambled signal. The scrambled signal is then descrambled by a descrambling unit in the transceiver (e.g., using a key provided by the MSO, for example, in the smart card). However, the typical transceiver includes a number of internal components or functional blocks. To provide the copyrighted services to the user, the descrambed signal needs to be coupled to one or more additional internal components of the transceiver for further processing. To prevent pirating of the descrambled signal, various prior art schemes are used to prevent unauthorized access to the audio video content of the descrambled signal. For example, in many cases, certain secure transmission techniques are employed which use encryption and decryption to protect the descrambled signal. In other cases, various encapsulation methods (e.g., epoxy encapsulation) are employed which prevent access to the transceiver circuit board.

Prior Art FIG. 1 is a block diagram showing some of the elements in one embodiment of a prior art transceiver (e.g., a set-top box) that uses both encryption and encapsulation to protect the descrambled signal. It should be noted that for clarity, not all of the elements of the set-top box are shown. Front-end unit 20 of the set-top box comprises a tuner (not shown), as well as other devices known in the art, for receiving a digital broadcast signal 90. Coupled to front-end unit 20 is a point of deployment (POD) 10. POD 10 typically is adapted to receive a smart card (not shown) that, as described above, can be used to provide billing information to the MSO. The smart card also typically contains a key provided by the MSO that is used to descramble digital broadcast signal 90. POD 10 includes a descrambling/ encryption unit 40 that uses the key provided by the MSO to descramble broadcast signal 90 (if the signal is scrambled). Descrambling/encryption unit 40 also encrypts the signal (if the signal is not encrypted). It is appreciated that, in other prior art embodiments, descrambling functionality and the encryption functionality of unit 40 may consist of separate elements, one for descrambling and one for encrypting.

Front-end unit 20 also includes decryption unit 50 for decrypting an encrypted broadcast signal before the signal is sent to audio/visual (A/V) decoder 30. A/V decoder 30 is used for demultiplexing the signal and for decoding, for example, MPEG (Moving Picture Experts Group) video signals and/or Dolby AC3 audio signals.

Thus, in this prior art embodiment, digital broadcast signal 90 is received by the set-top box at front-end unit 20 and forwarded to POD 10. Broadcast signal 90 is descrambled by descrambling/encryption unit 40. Once descrambled, broadcast signal 90 is encrypted to prevent unauthorized duplication. Further downstream in the set-top box, broadcast signal 90 is decrypted using decryption unit 50 so that it can be decoded (e.g., MPEG or AC3 decoding) in A/V decoder 30, and subsequently processed so that it can be viewed and/or listened to by an authorized subscriber.

A problem with this prior art embodiment is that, between decryption unit 50 and A/V decoder 30, broadcast signal 90 is transmitted in the clear at point 12 (that is, it is not scrambled nor is it encrypted at this point). Thus, at point 12, broadcast signal 90 can be intercepted and duplicated. As a digital signal, it is possible to make near perfect copies which can be readily distributed to unauthorized parties (e.g., rebroadcast via the Internet, copied onto a compact disk, etc.). While the MSO may receive payment for a one-time use, subsequent use by unauthorized users is made without proper compensation to the MSO or the copyright owners.

With the advent of digital cable, including Internet access, set-top boxes have bi-directional capability, and increased bandwidth requirements, resulting in audio video signals being transported between an increased number of functional modules within the cable set-top box. Unfortunately, this creates new opportunities for theft of the digital audio video content. Thus, while Prior Art FIG. 1 shows a single bus line 12 where broadcast signal 90 can be intercepted and duplicated, the most modern, most complex bi-directional set-top boxes will often have numerous such points of interception, as digital information is transmitted between and among numerous functional modules within the cable set-top box.

To prevent pirating, especially in the case of the more complex, bi-directional set-top boxes, numerous and varied prior art schemes are employed. Such schemes include, for example, "booby trapping" the transceiver housing in order to intentionally disable the transceiver should the housing be tampered with, the encapsulation of the entire circuit board of the transceiver within a thick epoxy layer to prevent access to circuit traces (e.g., intermodule buses), and the like. These methods are employed individually and in unison, all in an attempt to prevent theft of the audio video content of the descrambled signal.

While the above prior art methods are successful to some extent, they have proven unable to stop the more sophisticated pirates. Such individuals, for example, often have detailed technical knowledge of the transceiver which allows them to, for example, determined an exact location at which to "drill" or "tap" a bus trace to obtain access to the descrambled signal, or to disable any housing booby traps. Additionally, the incorporation of such multiple security schemes imposes a significant cost penalty on the design and manufacture of set-top box transceivers. Such schemes often require the incorporation of special-purpose, specially designed, one-of-a-kind type components designed specifically for a single model of transceiver.

SUMMARY OF THE INVENTION

The present invention provides a method and system for implementing secure transmission of content contained in a digital broadcast signal. The system of the present invention can prevent unauthorized access to a digital data stream within the transceiver by, for example, sophisticated unauthorized users, even where such users have detailed technical knowledge of the transceiver. The system the present invention provides for secure transmission without requiring the incorporation of exotic, one-of-a-kind type components for transmitting the data between functional modules of the transceiver. The content of the digital broadcast signal is protected without requiring the imposition of multiple security schemes that impose significant cost penalties on the design and manufacture of the transceiver.

In one embodiment, the present invention is implemented as a transceiver system for receiving content contained in a secure digital broadcast signal. The transceiver system uses a single high bandwidth bus to transfer encrypted data between the multiple components of the transceiver. The data is encrypted to prevent access to secure content as the content is transferred across the bus.

The transceiver system includes a first component for generating a data stream from a received digital broadcast signal. A first encryption unit is coupled to the first component. The first encryption unit is configured to encrypt the data stream generated from the digital broadcast signal, resulting in encrypted data stream. Transceiver system includes a second component for generating a video signal for a monitor to view content contained in digital broadcast signal. A second encryption unit is coupled to the second component for decrypting the encrypted data stream received from the first component. The common bus is coupled to the first encryption unit and second encryption unit and is a high speed digital bus.

A third component is coupled to the bus for arbitration of the bus to coordinate the transmission of the encrypted data stream from the first encryption unit to the second encryption unit such that content from the data stream is securely transferred from the first component to second component. In so doing, the security of the content of the digital broadcast signal is maintained as the resulting data stream is processed by the first component and second component. The content of the digital broadcast signal is protected without requiring the imposition of multiple security schemes that impose significant cost penalties on the design and manufacture of the transceiver. All sensitive data is encrypted prior to transfer. Hence, no copyrighted or sensitive data is exposed in the clear on bus.

In one embodiment, the bus is implemented as a high bandwidth PCI (peripheral component interconnect) bus compliant with well known and widely supported PCI standards.

In one embodiment, the encrypted data stream is encrypted using an encryption routine compliant with the Data Encryption Standard Electronic Code Book (DES ECB).

In one embodiment, the data stream from the digital broadcast signal is a digital audio/visual media signal delivered to the transceiver using, for example, via a terrestrial line (e.g., a cable system), the World Wide Web (e.g., a connection to the Internet), or a wireless transmission (e.g., a satellite broadcast).

BRIEF DESCRIPTION OF THE DRAWINGS

The present invention is illustrated by way of example and not by way of limitation, in the figures of the accompanying drawings and in which like reference numerals refer to similar elements and in which.

Prior Art

DETAILED DESCRIPTION OF THE INVENTION

Figure 1:
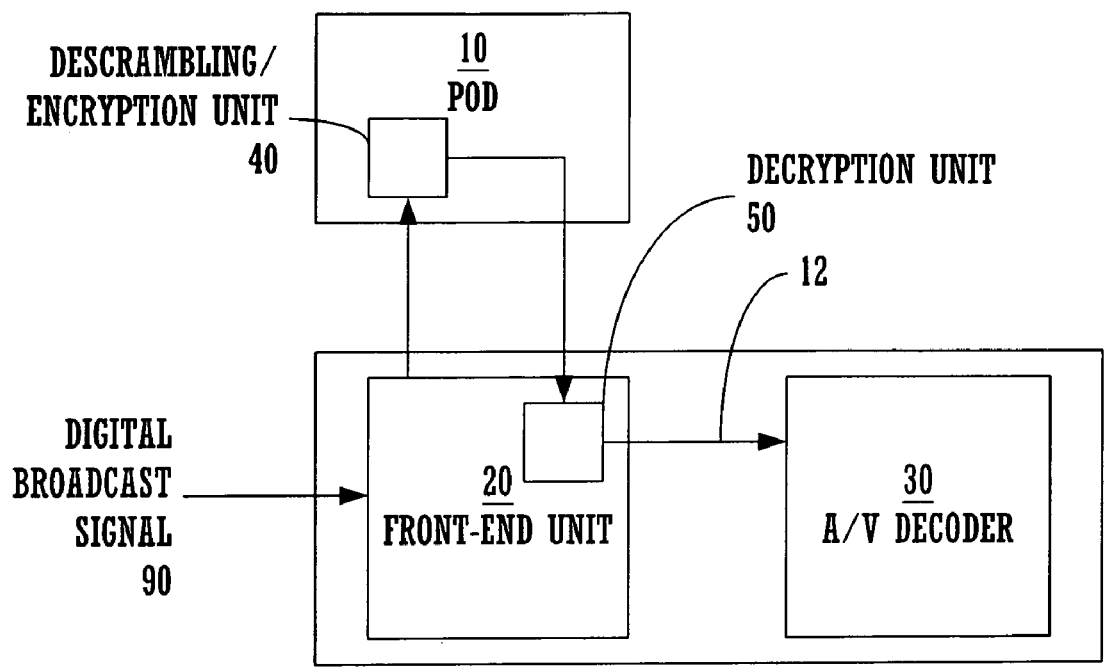
FIG. 1 shows a block diagram of the elements of one embodiment of a prior art transceiver.

Reference will now be made in detail to the embodiments of the invention, a method and system for a secure high bandwidth bus in a transceiver device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed toward a method and system for implementing secure transmission of content contained in a digital broadcast signal. Embodiments of the present invention use a high bandwidth bus to transfer encrypted data between the multiple components of the transceiver. The data is encrypted to prevent access to secure content as the content is transferred across the bus. The system of the present invention can prevent unauthorized access to a digital data stream within the transceiver by, for example, sophisticated unauthorized users, even where such users have detailed technical knowledge of the transceiver. The system the present invention provides for secure transmission without requiring the incorporation of exotic, one-of-a-kind type components for transmitting the data between functional modules of the transceiver. The content of the digital broadcast signal is protected without requiring the imposition of multiple security schemes that impose significant cost penalties on the design and manufacture of the transceiver. The present invention and its benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "encrypting," "transmitting," "descrambling," "arbitration," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

The Transceiver of the Present Invention

Figure 2:
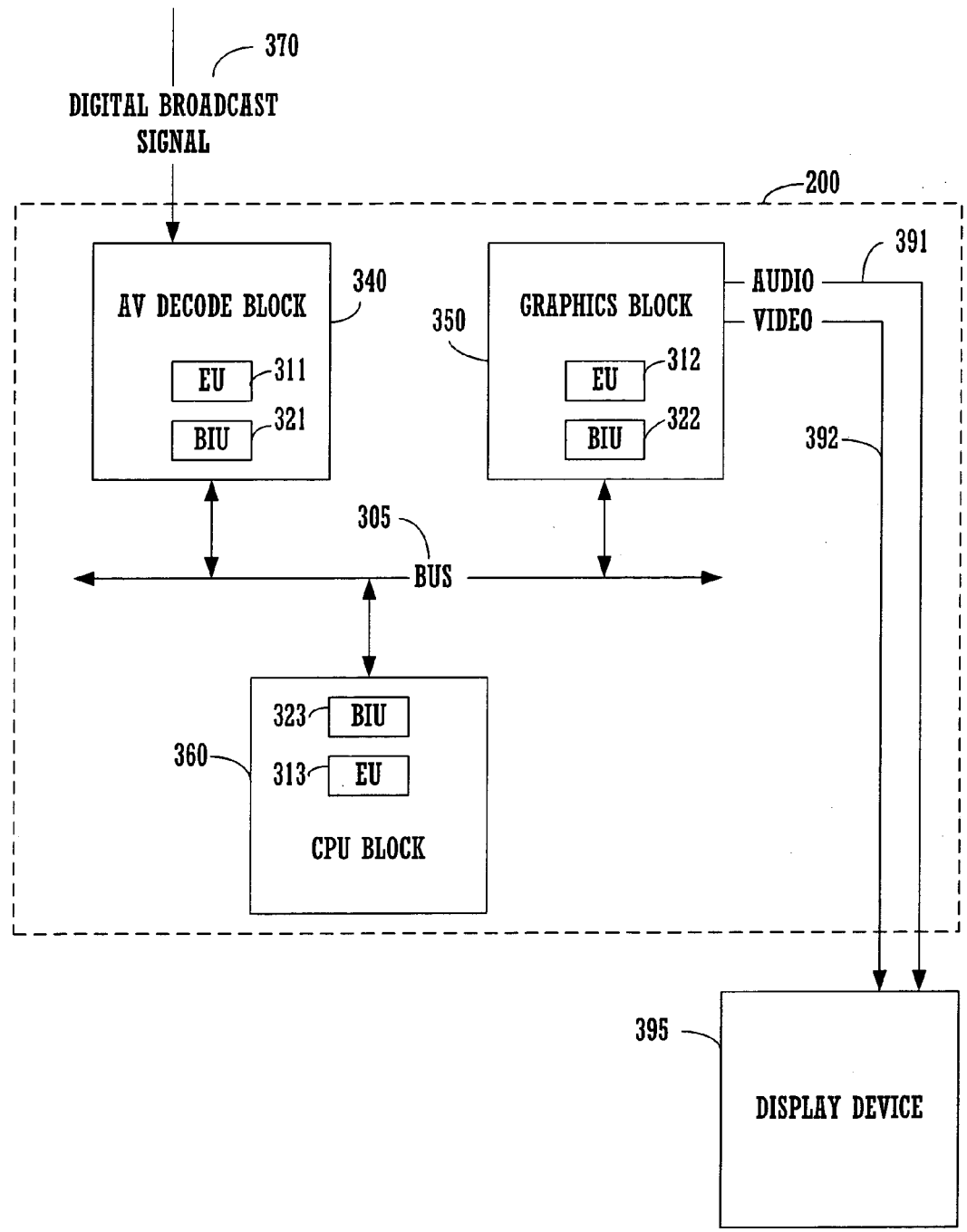
FIG. 2 shows an overview diagram transceiver in accordance with one embodiment of the present invention.

FIG. 2 shows a transceiver 200 in accordance with one embodiment of the present invention. As depicted in FIG. 2, transceiver 200 includes three components, or functional blocks: an audio video decode block 340, a graphics block 350, and a CPU block 360. The components are each coupled to a high bandwidth bus 305.

In the present embodiment, transceiver 200 functions in part by receiving content contained in a secure digital broadcast signal 370, demodulating and descrambling the digital broadcast signal 370 and distributing the resulting data stream among the functional blocks 340, 350, and 360 for processing and subsequent delivery to a user via the coupled display device 395 (e.g., a television). In accordance with the present invention, the security of content of the data stream is maintained as the data stream is distributed among the functional blocks.

Referring still to FIG. 2, the transceiver 200 of the present embodiment includes AV decode block 340 for generating a data stream from a received digital broadcast signal. In this embodiment, AV decode block 340 includes receiving and descrambling functionality to down-convert the received digital broadcast signal 370 and descramble the data stream modulated thereon. A first encryption unit 311 is coupled to the AV decode block 340. Encryption unit 311 is configured to encrypt the data stream generated from the digital broadcast signal 370, resulting in encrypted data stream.

Transceiver 200 includes graphics block 350 for generating an audio signal 391 and a video signal 392 for a display device 395 (e.g., a television monitor) to view the content contained in digital broadcast signal 370. A second encryption unit 312 is coupled to the graphics block 350 for decrypting the encrypted data stream received from the audio video decode block 340.

The encryption units function by both encrypting the outgoing data streams as required and decrypting the incoming data streams as required. Hence, it should be noted that both encryption and decryption functionality is included in each unit.

A bus 305 is coupled to the first encryption unit 311 and second encryption unit 312. The bus 305 functions by providing a high-speed, high bandwidth, bi-directional communications pathway between the AV decode block 340 and the graphics block 350.

The CPU block 360 is coupled to the bus 305 in order to implement arbitration of bus 305 to coordinate the transmission of the encrypted data stream from the first encryption unit (e.g., AV decode block 340) to the second encryption unit (Graphics Block 350). The data stream is transferred from the first encryption unit 311 of the AV decode block 340 to the second encryption unit 312 of the graphics block 350 in an encrypted form such that content from the data stream is securely transferred, without being exposed on bus 305 "in-the-clear" such that it is vulnerable to interception and pirating.

In so doing, the security of the content of the digital broadcast signal 370 is maintained as the resulting data stream is processed by the AV decode block 340 and the graphics block 350. The content of the digital broadcast signal 370 is protected without requiring the imposition of multiple security schemes that impose significant cost penalties on the design and manufacture of the transceiver.

In this manner, the use of encryption units 311–313 "de-couples" the security aspect of transferring the data stream between the blocks of transceiver 200 (e.g., AV decode block 340 and graphics block 350) from the data transfer bandwidth and efficiency aspect of transferring the data stream. For example, in the present embodiment, bus 305 need not include any specially designed, non-standardized (e.g., one-of-a-kind) features for security. All sensitive data is encrypted prior to transfer. Hence, no copyrighted or sensitive data is exposed in the clear on bus 305.

Referring still to FIG. 2, in the present embodiment, each functional block (e.g., AV decode block 340) is integrated with its respective encryption unit and BIU as a single integrated circuit device, or ASIC (application specific integrated circuit). Hence, there is no point between each functional block's encryption unit and BIU where an unencrypted in-the-clear signal can be "tapped" or otherwise accessed improperly. Sensitive content only emerges from the functional blocks as an encrypted data stream, as the data stream is transferred across the bus.

Alternatively, in an embodiment where a functional block is not completely integrated (e.g., where a functional block is implemented as a circuit board of multiple chips), the functional block can be designed such that there is no inter-chip trace where a fully complete in-the-clear AV data stream can be tapped and intercepted. The multichip functional block can have its functionality implemented among the multiple chips such that only portions of the AV data stream are transmitted across any one inter-chip trace, thereby preventing the possibility of tapping a trace to obtain the in-the-clear signal.

As described above, the use of encryption units 311–313 de-couples the security aspect of transferring data from the efficiency aspect of transferring data. Because of this, bus 305 can be optimized for high speed, high efficiency data transfer. This allows the use of a high bandwidth, industry standard bus architecture for the implementation of bus 305. The use of such a bus architecture, in turn, eliminates the cost penalties involved in mass producing large numbers of transceivers in accordance with present invention.

In the present embodiment, bus 305 is a PCI bus (peripheral component interconnect bus), compatible with well known PCI specifications (e.g., PCI specification version 2.1). The interface with bus 305 is handled via a BIU (bus interface unit) built into each functional block coupled to the bus (e.g., BIU 321–323). The specific implementing functionality required to interface with PCI is incorporated in each respective block's BIU. This aspect simplifies the interfaces for each functional block, since PCI BIUs are substantially the same for each functional block and the specific requirements for PCI compliant BIUs are well known. In other words, the functionality required to interface with a PCI bus is well known, and hence, relatively standardized. Thus, in accordance with the present invention, new functional blocks can be readily incorporated into transceiver 200 by equipping them with an appropriate BIU and encryption unit. This provides significant cost savings while maintaining security of the data stream. In addition, this greatly increases the number possible new functions which can be added to transceiver 200, due the very large number of pre-existing PCI compliant devices.

The use of a high performance bus such as a PCI bus allows a single bus (e.g., bus 305) to perform all data transfer functions. In transceiver 200 or the present embodiment, bus 305 performs all data transfer functions. This greatly simplifies the internal architecture of the transceiver 200, providing additional efficiency benefits and cost savings. The use of a single bus provides for a single point of management and configuration. The encryption process of encryption units 311–313 is controlled from the single point, in this embodiment, the CPU block 360.

Additionally, it should be noted that, although the data stream itself is encrypted, the configuration and control signals of bus 305, such as, for example, the PCI control signals REQ#, GNT#, FRAME#, C/BE#, etc. need not be encrypted. Thus, in the operation of its configuration, arbitration, control, etc., bus 305 functions as if it where a typical PCI bus. However, the data "payload" is encrypted. For example, once a transaction is initiated, the actual data payload of the transaction is encrypted. In this manner, the transport of the encrypted data stream is transparent to the PCI bus architecture.

Since each functional block is implemented as a single integrated circuit, no additional security features are required. No epoxy encapsulation is required. No booby trapping is required. This greatly reduces costs and reduces the chances of malfunctions due to defects bugs, etc.

Additional description of the transceiver of the present invention is contained in U.S. patent application Ser. No. 09/474,920, filed on Dec. 29, 1999, entitled "A METHOD AND SYSTEM FOR A BI-DIRECTIONAL TRANSCEIVER FOR COMBINING INTERNET INFORMATION WITH VIDEO INFORMATION TO CREATE AN INTERACTIVE DISPLAY INTERFACE" by Maruo, et al., and in U.S. patent application Ser. No. 09/538,605, filed on Mar. 29, 2000, entitled "METHOD AND APPARATUS FOR A MODULARIZED BI-DIRECTIONAL TUNING SYSTEM" by Maruo, et al., which are both incorporated herein by reference.

Figure 3:
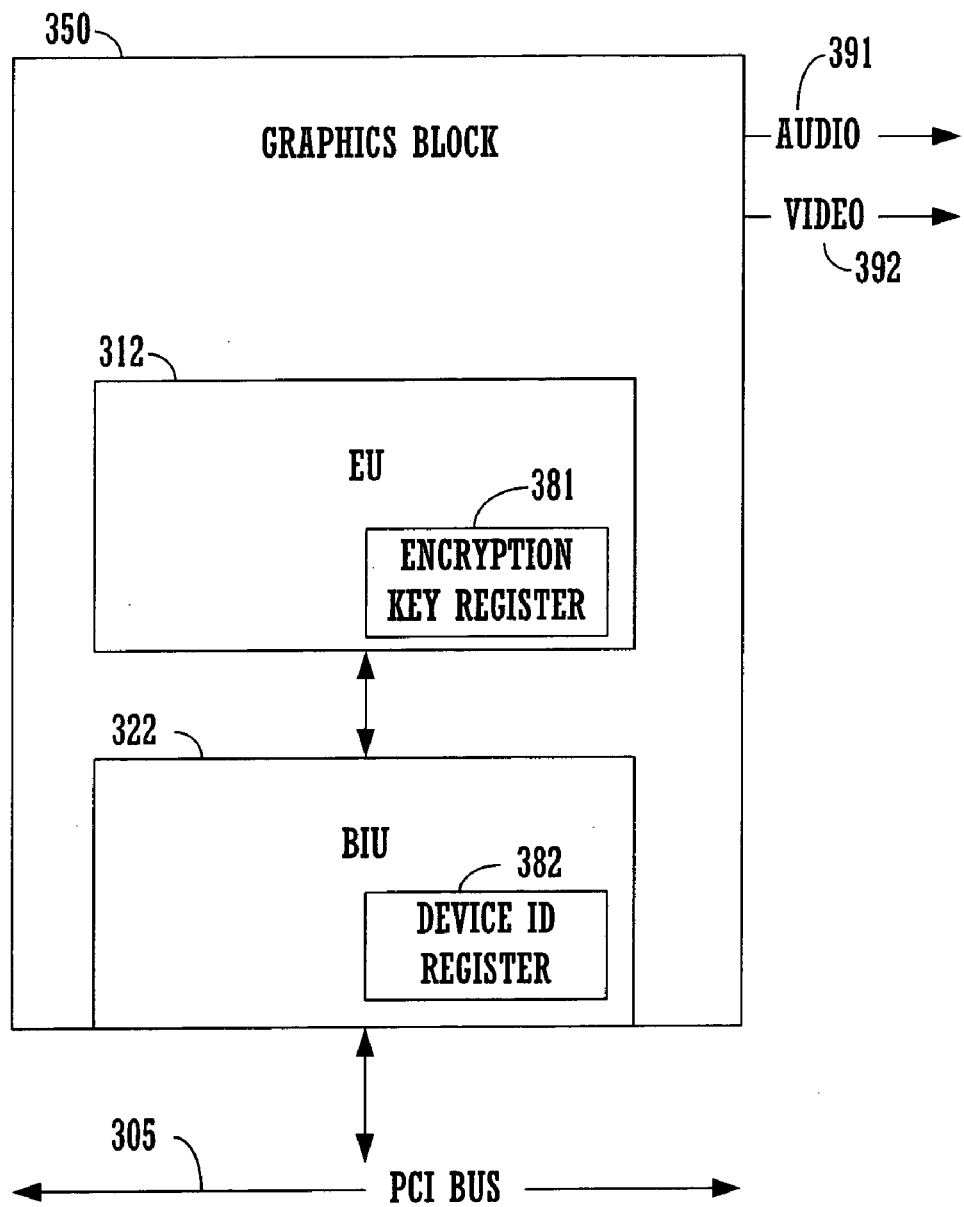
FIG. 3 shows a diagram depicting the internal components of graphics block in accordance with one embodiment of the present invention.

FIG. 3 shows a diagram depicting the internal components of graphics block 350 in accordance with one embodiment of the present invention in great detail. Graphics block 350 includes an encryption unit 312 and a BIU 322 as described above. FIG. 3 also shows encryption unit 312 including an encryption key register 381 and BIU 322 including a device ID register 382.

As described above, the security of the data stream is maintained by encryption prior to transmission from one functional block to another via bus 305. Each of the functional blocks are integrated. The encryption processing of encryption units 311–313 is managed from the CPU block 360. In the present embodiment, upon initial power up, each functional block coupled to bus 305 is recognized and configured. Unrecognized functional blocks are ignored by the CPU block (they are not configured during the initial power up, or they are never granted the bus to perform data transactions, they are never targets of PCI transactions, etc.). This aspect can prevent unauthorized alteration of the configuration of transceiver 200 after shipment from, for example, the service provider.

To facilitate recognition upon initial power up and the subsequent management of the encryption-decryption processing, each functional block coupled to bus 305 has a unique device ID used to manage its operation during the various PCI data transfers (e.g., arbitration, initiating transactions, receiving transactions, etc.). This device ID can be set during manufacturing, or can be assigned by CPU block 360 during initial power-up and configuration. The device ID is stored in device ID register 382. Each functional block is also assigned an encryption key during initial power-up and configuration by the CPU. This encryption key is stored in encryption key register 381.

In the present embodiment, the encryption unit 312 uses the encryption key and the device ID to identify graphics block 350 to CPU block 360 and the other functional blocks coupled to bus 305 and to recognize other functional blocks coupled to bus 305. In addition, the encryption unit 312 uses the encryption key and device ID to encrypt and decrypt data during write transactions and read transactions. The operation and management of the encryption-decryption processes of each functional block is centrally controlled by the CPU block 360. For example, separate data transactions can be used to distribute encryption keys to each of the functional blocks, with CPU block 360 acting as both the initiator of the data transactions and the arbiter of bus 305. In one embodiment, encryption keys are transmitted to each functional block after the initial power up configuration.

In one embodiment, the encryption process is based upon a well-known DES ECB (Data Encryption Standard Electronic Code Book) encryption routine and a key length of 56 bits. However, it is appreciated that other well-known and commercially available encryption routines and different key lengths may be used in accordance with the present invention.

Figure 4:
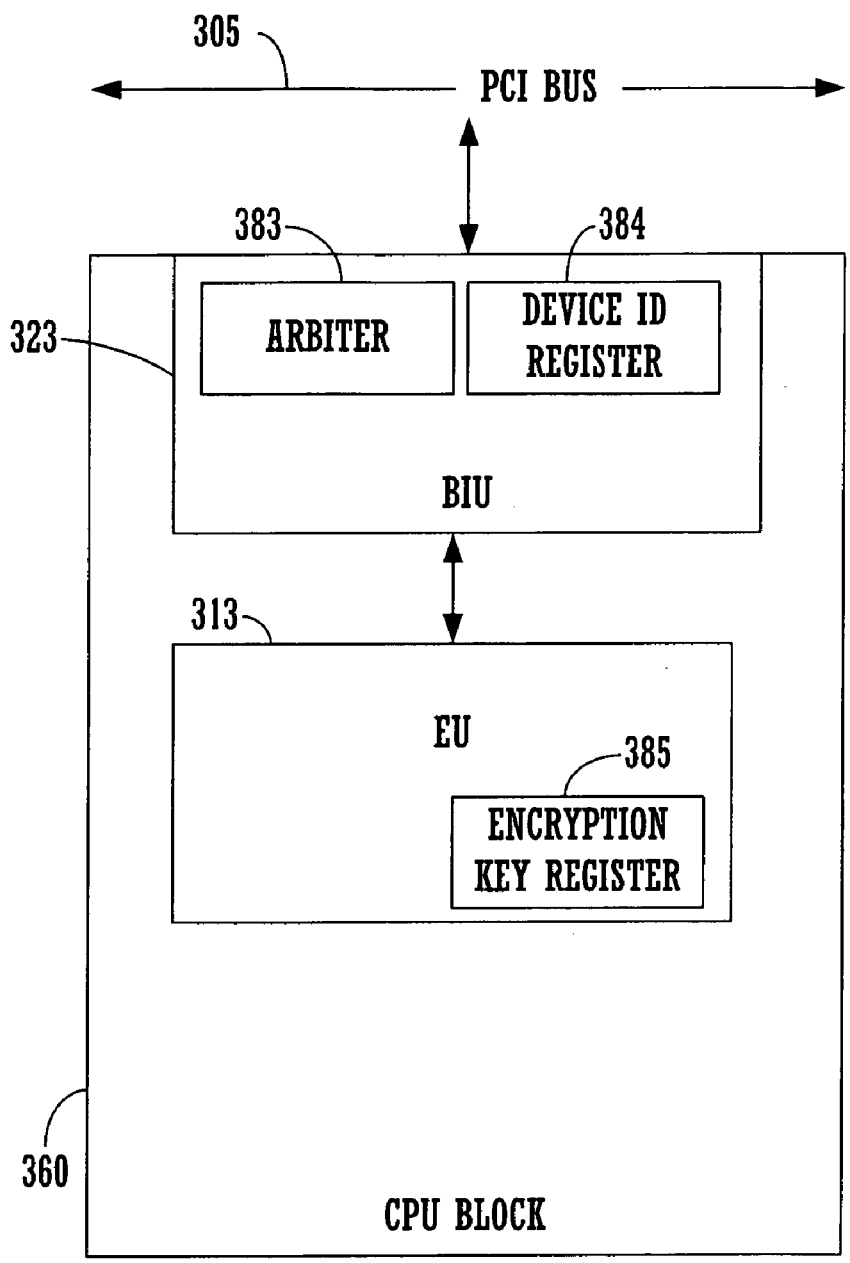
FIG. 4 shows a diagram depicting the internal components of CPU block in accordance with one embodiment of the present invention.

FIG. 4 shows a diagram depicting the internal components of CPU block 360 in accordance with one embodiment of the present invention in greater detail. As depicted in FIG. 4, CPU block 360 includes encryption unit 313 and BIU 323 as described above. FIG. 4 also shows encryption unit 313 including its respective encryption key register 385 and BIU 323 including its respective device ID register 384 and a PCI bus arbiter 383.

As described above, each functional block coupled to bus 305 includes its respective BIU and encryption unit. However, as described above, CPU block 360 functions as the arbiter of bus 305 and thus also includes bus arbiter 383. In the present embodiment, in accordance with PCI specifications, arbiter 383 controls the ownership of bus 305.

As known by those skilled in the art, PCI bus 305 is comprised of functional signal lines, for example, interface control lines, address/data lines, error signal lines, and the like. Each functional block is coupled to the functional signal lines comprising PCI bus 305 and functions as a PCI agent. In accordance with PCI specifications, when one PCI agent requires the use of bus 305 to transmit data, it requests PCI bus ownership from arbiter 383 of CPU block 360. The PCI agent requesting ownership is commonly referred to as an "initiator", or bus master. Upon being granted ownership of PCI bus 305 from arbiter 383, the initiator (e.g., AV decode block 340) carries out its respective data transfer (e.g., data read transaction, data write transaction, configuration access, etc.).

In accordance with PCI specifications, PCI agents coupled to a PCI bus may independently request PCI bus ownership. Thus, at any given time, AV decode block 340, graphics block 350, and any other coupled functional block may be requesting ownership simultaneously. Where there are simultaneous requests for ownership, arbiter 383 arbitrates between the requesting blocks to determine which requesting block is granted ownership of bus 305. When one the requesting blocks is granted ownership, it initiates its transaction (e.g., data transfer) with a "target" or slave block, for example, where AV decode block 340 initiates a data transaction (initiator) to graphics block 350 (target). When the data transaction is complete, the initiator (e.g., AV decode block 340) relinquishes ownership of the bus 305, allowing arbiter 383 to reassign bus 305 to another requesting functional block.

Thus, the functional blocks coupled to bus 305 follow the definitive set of protocols and rules governing the operation of PCI compliant buses. These protocols standardize the method of accessing, utilizing, and relinquishing bus 305, so as to maximize its data transfer bandwidth. The versions of the PCI bus protocols and specifications are set forth in an industry standard PCI specification (e.g., PCI Specification—Revision 2.1). As known by those skilled in the art, the PCI bus architecture is a high-performance, high-speed bus architecture. Using bus 305, data transfer rates of up to 528 Mbytes per second can be achieved (e.g., 32-bit PCI bus 305 operating at 66 MHz).

As described above, the configuration and control signals of PCI bus 305, such as, for example, the PCI control signals REQ#, GNT#, FRAME#, C/BE#, etc., need not be encrypted. Thus, in the operation of its configuration, arbitration, and control functions, bus 305 functions as if it where a typical PCI bus. However, the data "payload" is encrypted. For example, once a transaction is initiated, the actual data payload of the transaction is encrypted. In this manner, the transport of the encrypted data stream can be completely transparent to the PCI bus architecture.

Figure 5:
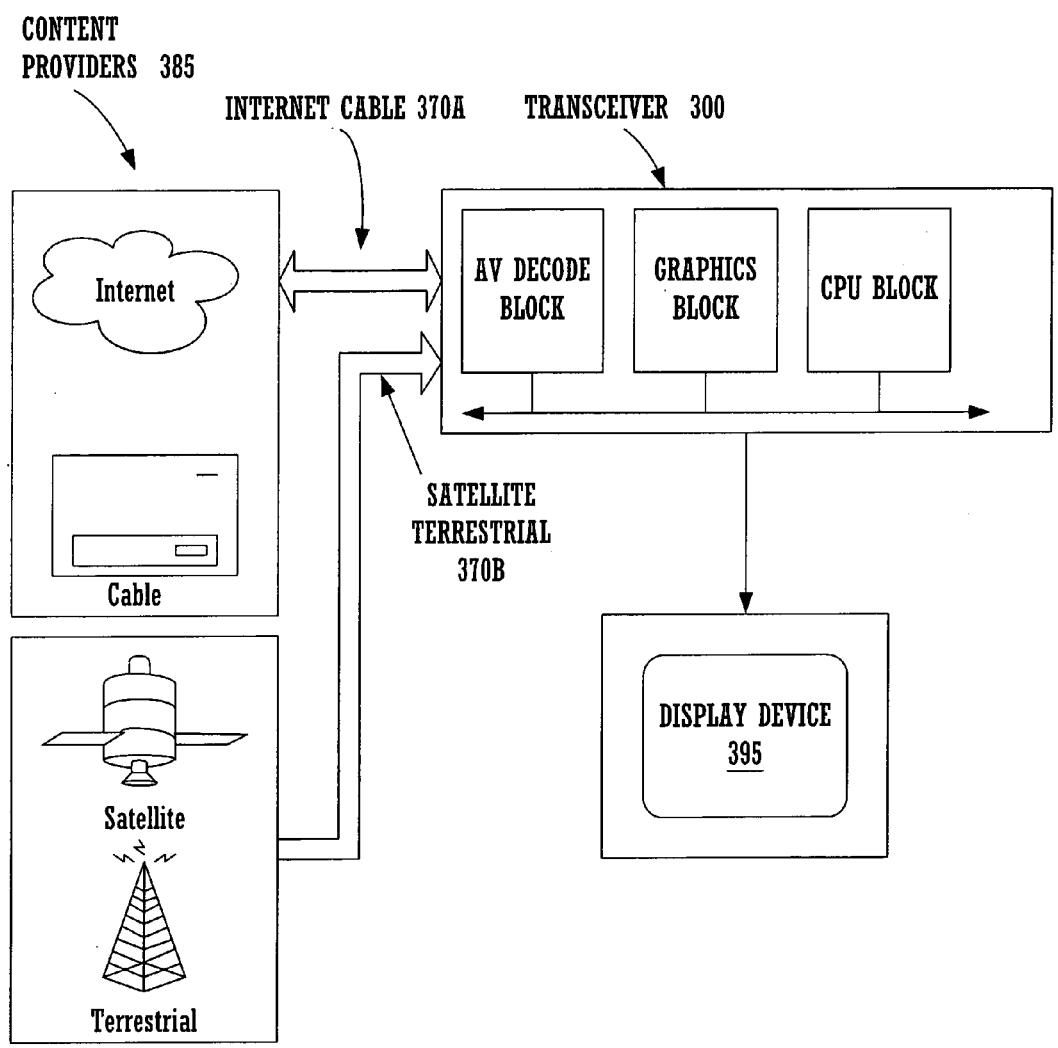
FIG. 5 shows an overview diagram depicting the relationship of a transceiver in accordance with one embodiment of the present invention to the broadcast circuits of an MSO.

FIG. 5 shows an overview diagram depicting the relationship of transceiver 300 to the broadcast means of the MSO. As described above, digital broadcast signal 370 can be delivered to transceiver 200 using any of the various mechanisms currently in use or envisioned, such as a terrestrial line (e.g., a cable system), the World Wide Web (e.g., a connection to the Internet), or a wireless transmission (e.g., a satellite broadcast or terrestrial broadcast). This is depicted in FIG. 5 as digital broadcast signal 370a from internet/cable 585 and digital broadcast signal 370b from satellite/terrestrial broadcast 585. Which ever format or means of reception is used, the secure encryption method of the present embodiment ensures premium copyrighted services are securely transmitted from signals 370a–370b to display device 395.

Figure 6:
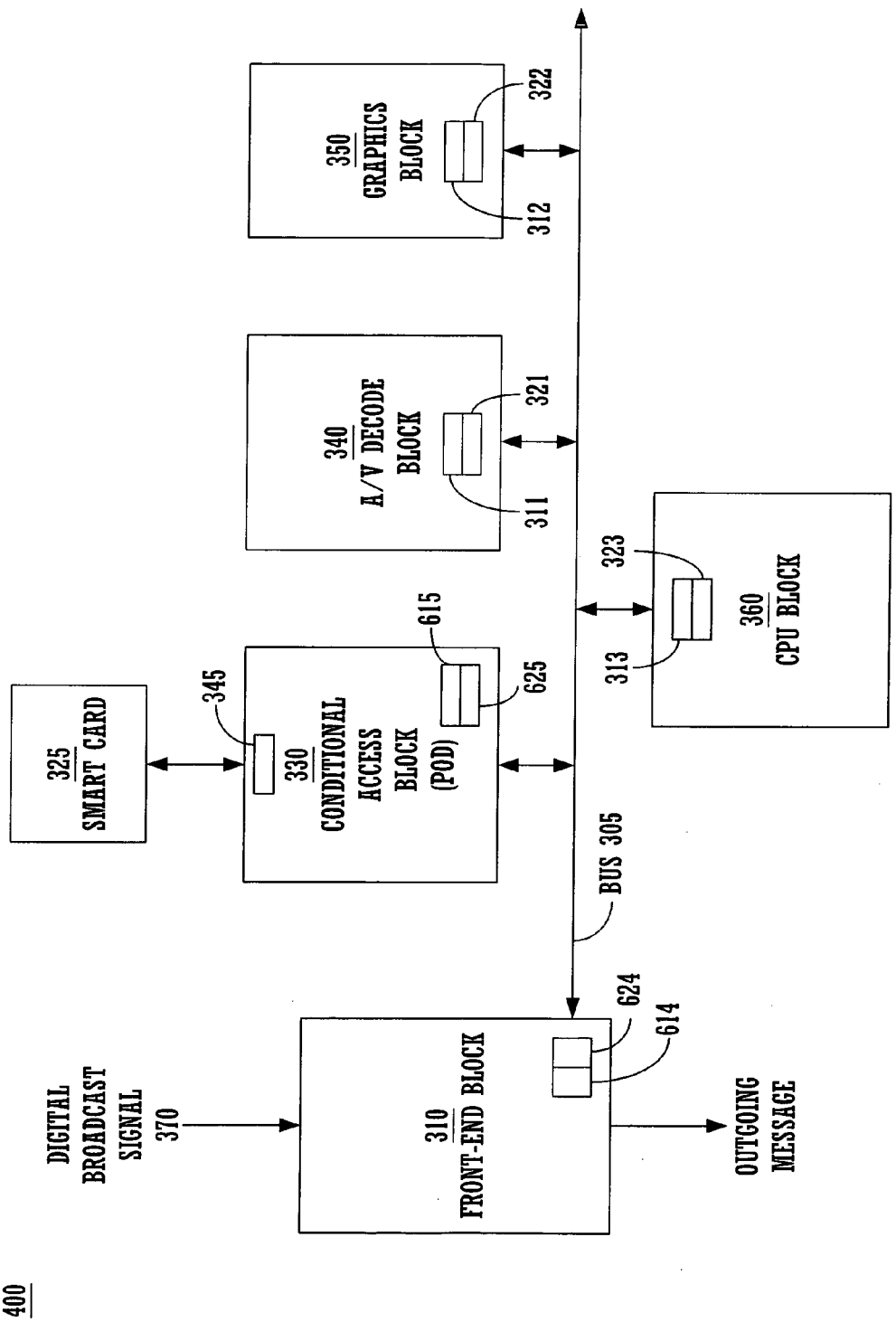
FIG. 6 shows an overview diagram of a transceiver in accordance with one alternative embodiment of the present invention.

FIG. 6 shows a more detailed diagram of a transceiver 400 (e.g., a set-top box) in accordance with one embodiment of the present invention. In the present embodiment, transceiver 400 includes a front-end block 310 coupled to bus 305, conditional access block 330 coupled to front-end block 310 and bus 305, audio/video (A/V) decode block 340 coupled to conditional access block 330 and bus 305, graphics block 350 coupled to A/V decode block 340 and bus 305, and central processing unit 360 coupled to bus 305. Conditional access block 330, also referred to as a point of deployment (POD), is adapted to receive smart card 325.

Transceiver 400 of FIG. 6 is substantially similar to transceiver 200 of FIG. 2. However, Transceiver 400 receives digital broadcast signal 370 via a separate front end block 310 and is transmitted to conditional access block 330 for descrambling and subsequent transmission to A/V decode block 340. As with transceiver 200 in FIG. 2, with transceiver 400, each functional block coupled to bus 305 includes its respective BIU and encryption unit. For example, front end block 310 and conditional access block 330 include BIUs 624–625 and encryption units 614–615 respectively.

In the present embodiment, front-end block 310 contains one or more tuners for receiving digital broadcast signal 370. For example, in one embodiment, front-end block 310 can contain a tuner for receiving a wireless transmission (e.g., a satellite broadcast) and another tuner for receiving a cable transmission. Front-end block 310 can also include a device (e.g., a modem) that allows a telephone or digital subscriber line (DSL) connection to be made to the World Wide Web so that a broadcast signal can be received via the Internet.

Smart card 325 stores information needed by a cable system operator or digital broadcast system operator (e.g., a Multiple System Operator, MSO) in order to bill a subscriber for services used by the subscriber (for example, the viewing of a pay-per-view movie or event). Typically, smart card 325 also includes a key that is used to descramble digital broadcast signal 370 (if the signal is scrambled). In the present embodiment, smart card 325 is inserted into conditional access block 330; however, it is appreciated that in other embodiments smart card 325 may be coupled in a different manner to intelligent transceiver 400 (for example, it may be inserted into either front-end block 310 or AN decode block 340). Using the key from smart card 325, conditional access block 330 descrambles digital broadcast signal 370.

Once digital broadcast signal 370 has been descrambled by a conditional access block 330, the resulting data stream is encrypted prior transmission to AV decode block 340 via bus 305 in the manner described above in the description of transceiver 200. The encryption unit (not shown) within conditional access block 330 encryption the data stream prior to transmit the data stream to AV decode block 340 via bus 305.

Thus, there is not a point for intercepting a signal that is in the clear (e.g., a decrypted and descrambled signal) between conditional access block 330 and AV decode block 340 or graphics block 350, nor is there a point within A/V decode block 340 or graphics block 350 where an in-the-clear signal can be externally accessed and intercepted. Therefore, the present invention provides a secure interface between conditional access block 330 and encryption unit 345 and also between encryption unit 345 and A/V decode block 340, and thus between front-end block 310 and A/V decode block 340. As such, the present invention can prevent pirating of a descrambled and decrypted digital signal.

In the present embodiment, A/V decode block 340 receives encrypted data stream from conditional access block 330 via bus 305, decrypts the data stream using its respective encryption unit (e.g., encryption unit 311 of FIG. 2), and decodes the video content and the audio content of digital broadcast signal 370. In the present embodiment, an MPEG (Moving Pictures Experts Group) video decoder and an AC3 (Digital Dolby) audio decoder are used; however, it is appreciated that other video or audio decoders can be used in accordance with the present invention. In addition, in one embodiment, A/V decode block 340 is capable of handling video and audio analog signals. The decoded data is subsequently encrypted and coupled to graphics block 350 via bus 305 for subsequent output to display device 395 (not shown).

Figure 7:
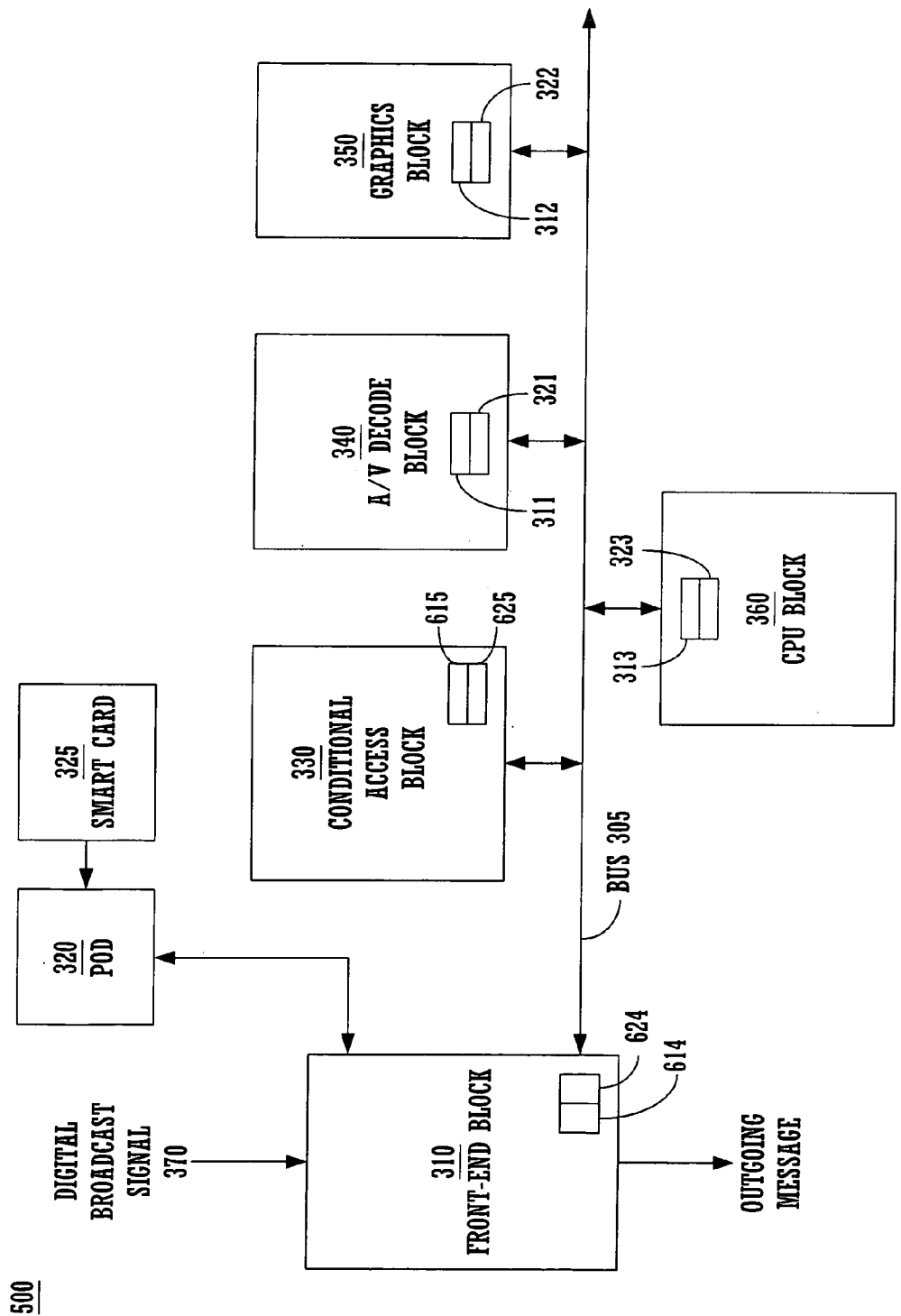
FIG. 7 shows an overview diagram of a transceiver in accordance with a second alternative embodiment of the present invention.

FIG. 7 is a block diagram of a transceiver 500 in accordance with another embodiment of the present invention. In this embodiment, point of deployment (POD) 320 is separate from conditional access block 330, and smart card 325 is plugged into POD 320 instead of conditional access block 330. In this embodiment, however, smart card 325 contains a key for descrambling digital broadcast signal 370, and this key is used by POD 320 to descramble digital broadcast signal 370. POD 320 also encrypts digital broadcast signal 370 prior transmission to find block 310 using an encryption unit. Although POD 320 is separate from conditional access block 330 in this embodiment, conditional access block 330 can still exist in intelligent transceiver 500. As with transceiver 400 in FIG. 6, with transceiver 500, each functional block coupled to bus 305 includes its respective BIU and encryption unit.

Figure 8:
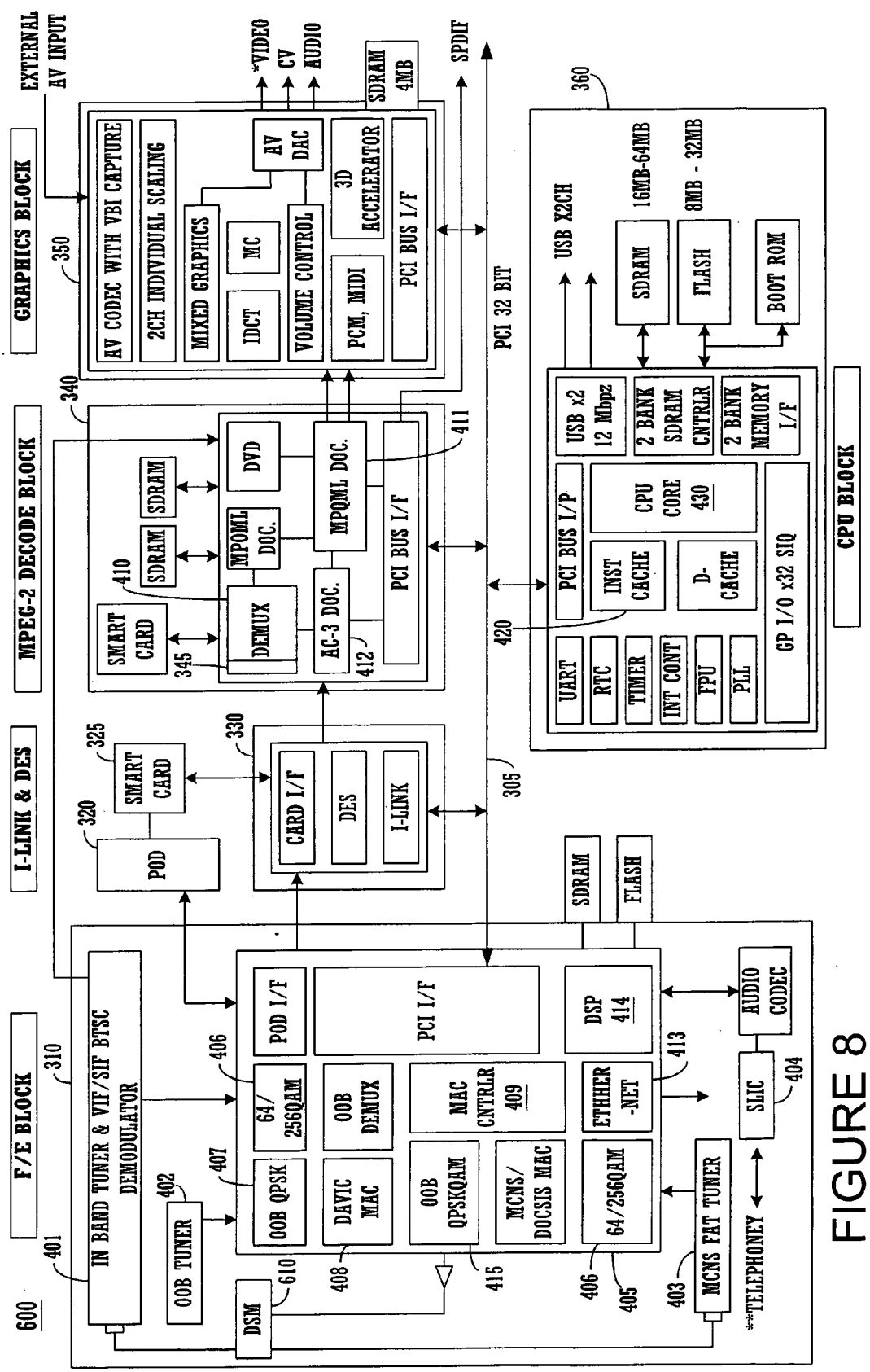
FIG. 8 shows a more detailed embodiment of a transceiver device in accordance with one embodiment of the present invention that incorporates aspects of the transceiver of FIG. 6 and the transceiver of FIG. 7.

FIG. 8 is a block diagram of a transceiver 600 (e.g., a bi-directional set-top box) showing additional details of the embodiments illustrated by FIG. 6 and FIG. 7. Table 1 is a list of the various elements and acronyms contained in FIG. 8.

TABLE 1

Elements and Acronyms of Transceiver Embodied in FIG. 8

| | |
|---|---|
| AVDAC | Audio Video Digital-to-Analog Converter |
| BTSC | Broadcast Television Systems Committee |
| D-Cache | Data Cache |
| DAVIC | Digital Audio Visual Council |
| DOCSIS | Data Over Cable Service Interface Specification |
| DSM | Diplexer, Splitter and Modulator |
| DSP | Digital Signal Processor |
| DVD | Digital Video Disk |
| FAT | Forward Application Tuner |
| FPU | Floating Point Unit |
| I/F | Interface |
| IDCT | Inverse Discrete Cosine Transform |
| Inst. Cache | Instruction Cache |
| Int. Cont. | Interrupt Controller |
| MAC | Media Access Control |
| MC | Motion Compensation |
| MCNS | Multiple Cable Network System |
| MIDI | Musical Instrument Digital Interface |
| MP@ML | Main Profile at Main Level |

TABLE 1-continued

Elements and Acronyms of Transceiver Embodied in FIG. 8

| | |
|---|---|
| OOB | Out of Band |
| PCI | Peripheral Component Interconnect |
| PCM | Pulse Code Modulation |
| PLL | Phase Locked Loop |
| QPSK | Quadrature Phase Shift Keying |
| QPSKQAM | QPSK Quadrature Amplitude Modulation |
| RTC | Real Time Clock |
| SLIC | Serial Line Internet Connection |
| UART | Universal Asynchronous Receiver-Transmitter |
| VBI | Vertical Blanking Interval |
| VIF/SIF | Video Intermediate Frequency/Sound Intermediate Frequency |

With reference to FIG. 8, in the present embodiment, front-end block 310 receives a scrambled digital broadcast signal (e.g., digital broadcast signal 370 of FIGS. 2 and 6) from a digital broadcaster via in-band tuner 401, OOB tuner 402 and/or MCNS FAT tuner 403. Smart card 325 includes a key to descramble the digital broadcast signal. It is appreciated that FIG. 8 shows some elements from the embodiments illustrated by FIGS. 6, and 7. In the case of the embodiment illustrated by FIG. 6, smart card 325 is inserted into conditional access block 330, and conditional access block 330 descrambles and encrypts the digital broadcast signal. In the case of the embodiment illustrated by FIG. 7, smart card 325 is plugged into POD 320. In this latter embodiment, the descrambling and encrypting functions are performed in POD 320, and so these functions are bypassed in conditional access block 330.

Continuing with reference to FIG. 8, the encrypted digital signal is delivered to A/V decode block 340 via bus 305. As with transceiver 200 in FIG. 2, with transceiver 600, each functional block coupled to bus 305 includes its respective BIU and encryption unit. In FIG. 8, the bus interface units are depicted as PCI I/F 624 for front-end block 310, BIU 625 for conditional access block 330, PCI I/F 321 for AV decode block 340, PCI I/F 322 for graphics block 350, and bus interface unit 323 for CPU block 360. The respective encryption units are depicted as encryption unit 614 for front-end block 310, encryption unit 615 for conditional access block 330, and respective encryption units 311–313 for AV decode block 340, graphics block 350, and CPU block 360.

As explained above, the descrambled data stream is first encrypted by conditional access block 330 prior to transmission to AV decode block 340 via bus 305, and encrypted by AV decode block 340 prior to transmission to graphics block 350 via bus 305, such that the descrambled data stream is never exposed as an in-the-clear signal (e.g., descrambled and not encrypted) between conditional access block 330, block 340, and block 350. Therefore, the secure data transmission process of the present invention provides a secure high bandwidth bus between conditional access block 330, A/V decode block 340, and graphics block 350 without requiring any added layers of security (e.g., epoxy encapsulation, booby trapping, etc.).

Continuing with reference to FIG. 8, in the present embodiment, A/V decode block 340 includes an MPEG decoder (e.g., graphics block 411) and an audio decoder (e.g., AC-3 block 412) to decode the video and audio content of digital broadcast signal 370. Graphics block 350 processes the audio and video information received from A/V decode block 340. Central processing unit 360 contains a processor (e.g., CPU core 430) and memory (e.g., instruction cache 420) for processing information and instructions used by intelligent transceiver 600.

Figure 9:
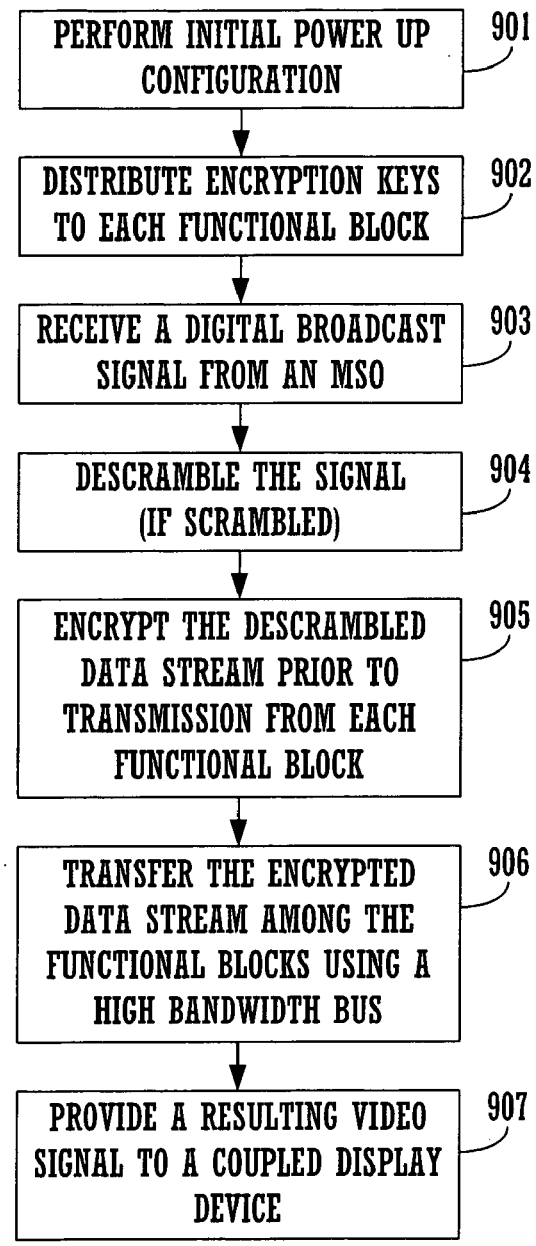
FIG. 9 shows a flowchart of the steps of a secure data transmission process in accordance with one embodiment of the present invention as implemented within a transceiver.

Referring now to FIG. 9, a flow chart of the steps of a system wide encryption/decryption process 900 in accordance with one embodiment of the present invention is shown. Process 900 depicts the basic operating steps of a secure high bandwidth bus as implemented in a set-top box transceiver in accordance with one embodiment of the present invention (e.g., transceiver 200 of FIG. 2).

Process 900 begins in step 901, where a transceiver in accordance with one embodiment of the present invention (e.g., transceiver 200 of FIG. 2) performs an initial power up configuration sequence. Upon initial power up, a CPU block (e.g., CPU block 360 of FIG. 2) interrogates the functional blocks coupled to a central bus (e.g., bus 305 of FIG. 2). As described above, the CPU block uses a device ID stored within each functional block to verify the correct configuration of the transceiver and otherwise configure the respective blocks for operation.

In step 902, encryption/decryption keys are distributed by the CPU block to each respective encryption unit of the functional blocks of the transceiver. As described above, to prevent unauthorized assess to a descrambled signal, the descrambled data stream is encrypted prior to transmission from any one of the functional blocks of the transceiver. For example, prior to transmitting a decoded descrambled data stream from A/V decode block 340 to graphics block 350, the data stream is first encrypted such that the in-the-clear signal is never exposed on the bus. The encryption process (e.g., a well-known DES ECB encryption routine and a key lengths of 56 bits) is managed and coordinated by the CPU. The distributed encryption keys allow each respective encryption unit (e.g., encryption units 311–313) to encrypt and/or decrypt the data stream as needed. Once the functional blocks have been configured and the encryption keys distributed, the transceiver is ready to begin processing received digital broadcast streams.

With continuing references to process 900 of FIG. 9, in step 903, a digital broadcast signal (e.g., digital broadcast signal 370 of FIG. 2) is received by the transceiver. Depending upon the particular embodiment, the digital broadcast stream is received directly in an AV decode block (e.g., transceiver 200 of FIG. 2) or is received in a separate front end block (e.g., front end block 310 of transceiver 400 of FIG. 6).

In step 904, the received digital broadcast signal is descrambled using descrambling circuits. As described above, the digital broadcast signal is transmitted from the MSO in a scrambled form to prevent unauthorized reception by "pirating" users. An authorized user can descramble the digital broadcast signal using a key provided by the MSO. Depending upon the particular transceiver embodiment, the descrambling functionality can be included in an A/V decode block (e.g., AV decode block 340 of FIG. 2), or a separate conditional access block (e.g., conditional access block 330 of FIG. 6). Alternatively, in some applications (e.g., non-copyrighted content), the digital broadcast stream can arrive in an unscrambled form, wherein descrambling would not be required.

In step 905, as described above, to prevent access to an in-the-clear signal, the descrambled data stream is encrypted prior to transmission from each functional block within the transceiver. For example, A/V decode block 340 encrypts the descrambled and decoded data stream prior to transmission to graphics block 350 via bus 305. In so doing, an in-the-clear signal is never exposed on the bus, and the bus can thus be optimized for high bandwidth and easy interoperability.

In step 906, the resulting encrypted data stream is transmitted across the internal bus of the transceiver (e.g., bus 305 of FIG. 2) among the functional blocks as required. As described above, prior to transmission from each block, the data stream is encrypted to prevent any point of access for pirating the signal. In the transceiver embodiments of FIGS. 2, 6, 7, and 8, the transceiver bus is implemented with a PCI bus architecture. The encryption process (e.g., a well-known DES ECB encryption routine and a key lengths of 56 bits) is managed and coordinated by the CPU. The distributed encryption keys allow each encryption unit (e.g., encryption units 345–346) to encrypt and/or decrypt the data stream as needed. The encryption process operates transparently with respect to the operation of the PCI bus.

In step 907, the data stream is processed as required by the functional blocks of the transceiver and the resulting video signal (e.g., from graphics block 350) is coupled to a display device for viewing by a user.

Thus, the present invention provides a method and system for implementing secure transmission of content contained in a digital broadcast signal. The system of the present invention can prevent unauthorized access to a digital data stream within the transceiver by, for example, sophisticated unauthorized users, even where such users have detailed technical knowledge of the transceiver. The system the present invention provides for secure transmission without requiring the incorporation of exotic, one-of-a-kind type components for transmitting the data between functional modules of the transceiver. The content of the digital broadcast signal is protected without requiring the imposition of multiple security schemes that impose significant cost penalties on the design and manufacture of the transceiver.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A bus architecture for a digital transceiver comprising:
a high speed bi-directional bus for communicating digital information thereon;
a first encryption/decryption unit (EDU) coupled to the bus for providing decrypted digital signals to a first functional unit from the bus and for providing encrypted digital signals to the bus from the first functional unit;
a second EDU coupled to the bus for providing decrypted digital signals to a second functional unit from the bus and for providing encrypted digital signals to the bus from the second functional unit; and
a controller for controlling transmission of digital signals on the bus wherein audio video signals are transmitted between the first and second EDUs in encrypted form, the controller also for establishing encryption/decryption keys for the first and second EDUs and without exposing an unencrypted data stream.

2. The architecture of claim 1 wherein the first functional unit is an audio video decode block for decoding a data stream from a digital broadcast signal.

3. The architecture of claim 1 wherein the second functional unit is a graphics block for generating a video signal from the audio video digital signals received from the first functional unit.

4. The architecture of claim 1 wherein the controller is a CPU.

5. The architecture of claim 1 wherein the encryption process is key-based encryption process and the controller manages the distribution of keys to the first encryption unit and the second encryption unit.

6. The architecture of claim 1 further comprising an arbiter coupled to the controller for arbitration of the bus.

7. The architecture of claim 1 wherein the first functional unit, second functional unit, and third functional unit include respective identification registers for identifying each functional unit.

8. The architecture of claim 1 wherein the audio video digital signals are encrypted using an encryption process substantially compliant with DES ECB (Data Encryption Standard Electronic Code Book).

9. The architecture of claim 1 wherein the bus is a PCI (Peripheral Component Interconnect) compliant bus.

10. The architecture of claim 1 further comprising a front end block coupled to the bus for receiving a digital broadcast signal and generating the audio video digital signals therefrom, the first functional unit coupled to receive the audio video signals from the front end block via the bus.

11. The architecture of claim 1 wherein the audio video digital signals are substantially compliant with a version of the MPEG (Moving Pictures Experts Group) format.

12. A transceiver system for receiving content contained in a secure digital broadcast signal, comprising:
a high speed bi-directional bus for communicating digital information thereon;
a first encryption/decryption unit (EDU) coupled to said bus for providing decrypted digital signals to a first functional unit from said bus and for providing encrypted digital signals to said bus from said first functional unit;
a second EDU coupled to said bus for providing decrypted digital signals to a second functional unit from said bus and for providing encrypted digital signals to said bus from said second functional unit; and
a controller for controlling transmission of digital signals on said bus wherein audio video signals are transmitted between said first and second EDUs in encrypted form, said controller also for establishing encryption/decryption keys for said first and second EDUs and without exposing an unencrypted data stream.

13. The transceiver system of claim 12 wherein said transceiver is a set-top box.

14. The transceiver system of claim 12 wherein said first functional unit is an audio video decode block for decoding said data stream from said digital broadcast signal.

15. The transceiver system of claim 12 wherein said second functional unit is a graphics block for generating said video signal from said data stream received from said first functional unit.

16. The transceiver system of claim 12 wherein said controller is a CPU (central processing unit) block coupled to said bus for managing an encryption process of said first encryption unit and said second encryption unit.

17. The transceiver system of claim 16 wherein the encryption process is key-based encryption process and said CPU block manages the distribution of keys to said first encryption unit and said second encryption unit.

18. The transceiver system of claim 16 further comprising an arbiter coupled to said CPU block for arbitration of said bus.

19. The transceiver system of claim 12 wherein the encryption process is key-based encryption process and said controller manages the distribution of keys to said first encryption unit and said second encryption unit.

20. The transceiver system of claim 12 further comprising an arbiter coupled to said controller for arbitration of said bus.

21. The transceiver system of claim 12 wherein said first functional unit, second functional unit, and third functional unit include respective identification registers for identifying each functional unit.

22. The transceiver system of claim 12 wherein said data stream encrypted using an encryption process substantially compliant with DES ECB (Data Encryption Standard Electronic Code Book).

23. The transceiver system of claim 12 wherein said bus is a PCI (Peripheral Component Interconnect) compliant bus and each encryption unit performs encryption and decryption.

24. The transceiver system of claim 12 further comprising a front end block coupled to said bus for receiving said digital broadcast signal and generating said data stream therefrom, said first functional unit coupled to receive said data stream from said front end block via said bus.

25. The transceiver system of claim 12 wherein said data stream is substantially compliant with a version of the MPEG (Moving Pictures Experts Group) format.

26. In a set-top box transceiver, a high security bus architecture for implementing secure transmission of data between components of said transceiver, comprising:
a high speed bi-directional bus for communicating digital information thereon;
a first encryption/decryption unit (EDU) coupled to said bus for providing decrypted digital signals to a first functional unit from said bus and for providing encrypted digital signals to said bus from said first functional unit;
a second EDU coupled to said bus for providing decrypted digital signals to a second functional unit from said bus and for providing encrypted digital signals to said bus from said second functional unit; and
a controller for controlling transmission of digital signals on said bus wherein audio video signals are transmitted between said first and second EDUs in encrypted form, said controller also for establishing encryption/decryption keys for said first and second EDUs and without exposing an unencrypted data stream.

27. The architecture of claim 26 wherein said first functional unit and said first encryption unit are built into a first integrated circuit device and said second functional unit and said second encryption unit are built into a second integrated circuit device.

28. The architecture of claim 26 wherein said first functional unit is an audio video decode block for decoding said data stream from an external source.

29. The architecture of claim 26 wherein said second functional unit is a graphics block for generating a video signal from said data stream received from said first functional unit.

30. The architecture of claim 26 wherein said first functional unit is a conditional access block for descrambling a digital broadcast signal.

31. The architecture of claim 26 wherein said second functional unit is an audio video decode block for decoding said data stream received from said first functional unit.

32. The architecture of claim 26 wherein said controller is a CPU (central processing unit) block coupled to said bus for managing an encryption process of said first encryption unit and said second encryption unit.

33. The architecture of claim 26 wherein the encryption process is key-based encryption process and said CPU block manages the distribution of keys to said first encryption unit and said second encryption unit via said bus.

34. The architecture of claim 32 further comprising an arbiter coupled to said CPU block for arbitration of said bus.

35. The architecture of claim 32 wherein said first functional unit, second functional unit, and third functional unit include respective identification registers for implementing component identification via said bus.

36. The architecture of claim 32 wherein said data stream is encrypted using an encryption process substantially compliant with DES ECB (Data Encryption Standard Electronic Code Book).

37. The architecture of claim 32 wherein said bus is a PCI (Peripheral Component Interconnect) compliant bus and provides bi-directional communication between said first functional unit and said second functional unit.

38. The architecture of claim 32 wherein the encryption process is key-based encryption process and said controller manages the distribution of keys to said first encryption unit and said second encryption unit via said bus.

39. The architecture of claim 32 further comprising an arbiter coupled to said controller for arbitration of said bus.

40. The architecture of claim 26 wherein said first functional unit, second functional unit, and third functional unit include respective identification registers for implementing component identification via said bus.

41. The architecture of claim 26 wherein said data stream is encrypted using an encryption process substantially compliant with DES ECB (Data Encryption Standard Electronic Code Book).

42. The architecture of claim 26 wherein said bus is a PCI (Peripheral Component Interconnect) compliant bus and provides bi-directional communication between said first functional unit and said second functional unit.

43. The architecture of claim 26 further comprising a front end block coupled to said bus for receiving said digital broadcast signal and generating said data stream therefrom, said first functional unit coupled to receive said data stream from said front end block via said bus.

44. The architecture of claim 26 wherein said data stream is substantially compliant with a version of the MPEG (Moving Pictures Experts Group) format.

* * * * *